(12) United States Patent
Winterholler et al.

(10) Patent No.: US 11,493,401 B2
(45) Date of Patent: Nov. 8, 2022

(54) ARRANGEMENT AND METHOD FOR DETECTING LEAKS IN A WATER PIPE SYSTEM

(71) Applicant: Viega Technology GmbH & Co. KG, Attendorn (DE)

(72) Inventors: Arthur Winterholler, Attendorn (DE); Ben Stähler, Kreuztal (DE); Christian Rischen, Eslohe (DE)

(73) Assignee: Viega Technology GmbH & Co. KG, Attendorn (DE)

( * ) Notice: Subject to any disclaimer, the term of this patent is extended or adjusted under 35 U.S.C. 154(b) by 296 days.

(21) Appl. No.: 16/683,727

(22) Filed: Nov. 14, 2019

(65) Prior Publication Data

US 2020/0158595 A1   May 21, 2020

(30) Foreign Application Priority Data

Nov. 16, 2018  (DE) ..................... 10 2018 128 855.7

(51) Int. Cl.
| | |
|---|---|
| *G01M 3/28* | (2006.01) |
| *F04B 51/00* | (2006.01) |
| *E03B 7/00* | (2006.01) |

(52) U.S. Cl.
CPC ........... *G01M 3/2815* (2013.01); *E03B 7/003* (2013.01); *F04B 51/00* (2013.01); *Y02A 20/15* (2018.01)

(58) Field of Classification Search
CPC ............ G01M 3/00; G01M 3/26; G01M 3/28; G01M 3/2815; E03B 7/00–08;
(Continued)

(56) References Cited

U.S. PATENT DOCUMENTS

| | | |
|---|---|---|
| 4,608,857 A | 9/1986 | Mertens et al. |
| 5,046,519 A | 9/1991 | Stenstrom et al. |

(Continued)

FOREIGN PATENT DOCUMENTS

| | | |
|---|---|---|
| DE | 3316849 A1 | 11/1983 |
| DE | 3905054 C1 | 4/1990 |

(Continued)

*Primary Examiner* — Nguyen (Wyn) Q Ha
(74) *Attorney, Agent, or Firm* — The Webb Law Firm

(57) ABSTRACT

The invention relates to an arrangement for detecting and locating a leakage in a water pipe system, having a water treatment system, having a pump, having a supply line and a drain, having at least one circulation line connected to the supply line and the drain, having at least one inlet valve, at least one outlet valve and at least one pressure sensor in at least one circulation line and/or the supply line and the drain, wherein the inlet valve and the outlet valve are electrically controllable, having control means for controlling the inlet valves and the outlet valves, having detection means for detecting the timewise development of the measured values of the at least one pressure sensor, with evaluation means for evaluating the timewise development of the pressure change and for comparing the amount of the pressure change with a limit value, and with output means for the output of a leakage indicating indication signal if the amount of the pressure change exceeds the limit value. This arrangement solves the technical problem of improving the detection and, if necessary, location of a leakage.

10 Claims, 1 Drawing Sheet

(58) Field of Classification Search
CPC ...... E03B 7/003; F04B 51/00; F17D 5/00–02; Y02A 20/15
See application file for complete search history.

(56) References Cited

U.S. PATENT DOCUMENTS

| | | | |
|---|---|---|---|
| 7,024,919 B2 * | 4/2006 | Arima | G01M 3/2815 |
| | | | 73/40.5 R |
| 9,823,156 B1 | 11/2017 | Jerphagnon et al. | |
| 9,939,346 B2 * | 4/2018 | Jerez | E03B 7/003 |
| 10,352,814 B2 * | 7/2019 | Enev | E03B 7/071 |
| 2011/0114202 A1 * | 5/2011 | Goseco | E03B 7/04 |
| | | | 137/487.5 |
| 2018/0328811 A1 | 11/2018 | Mielke et al. | |

FOREIGN PATENT DOCUMENTS

| | | | | |
|---|---|---|---|---|
| DE | 19529362 A1 | | 2/1997 | |
| DE | 102006039701 B3 | | 10/2007 | |
| DE | 102009051931 A1 | | 5/2011 | |
| DE | 102017110112 A1 | | 11/2018 | |
| EP | 2244091 A1 | * | 10/2010 | ............ G01M 3/26 |
| GB | 2313197 A | | 11/1997 | |
| GB | 2430496 A | * | 3/2007 | ......... G01M 3/2807 |
| GB | 2430496 A | | 3/2007 | |
| JP | 2002277294 A | * | 9/2002 | ............ G01F 1/00 |
| WO | WO-8901112 A1 | * | 2/1989 | ............ F17D 5/06 |
| WO | WO-2016172115 A1 | * | 10/2016 | ........... F15B 20/005 |

* cited by examiner

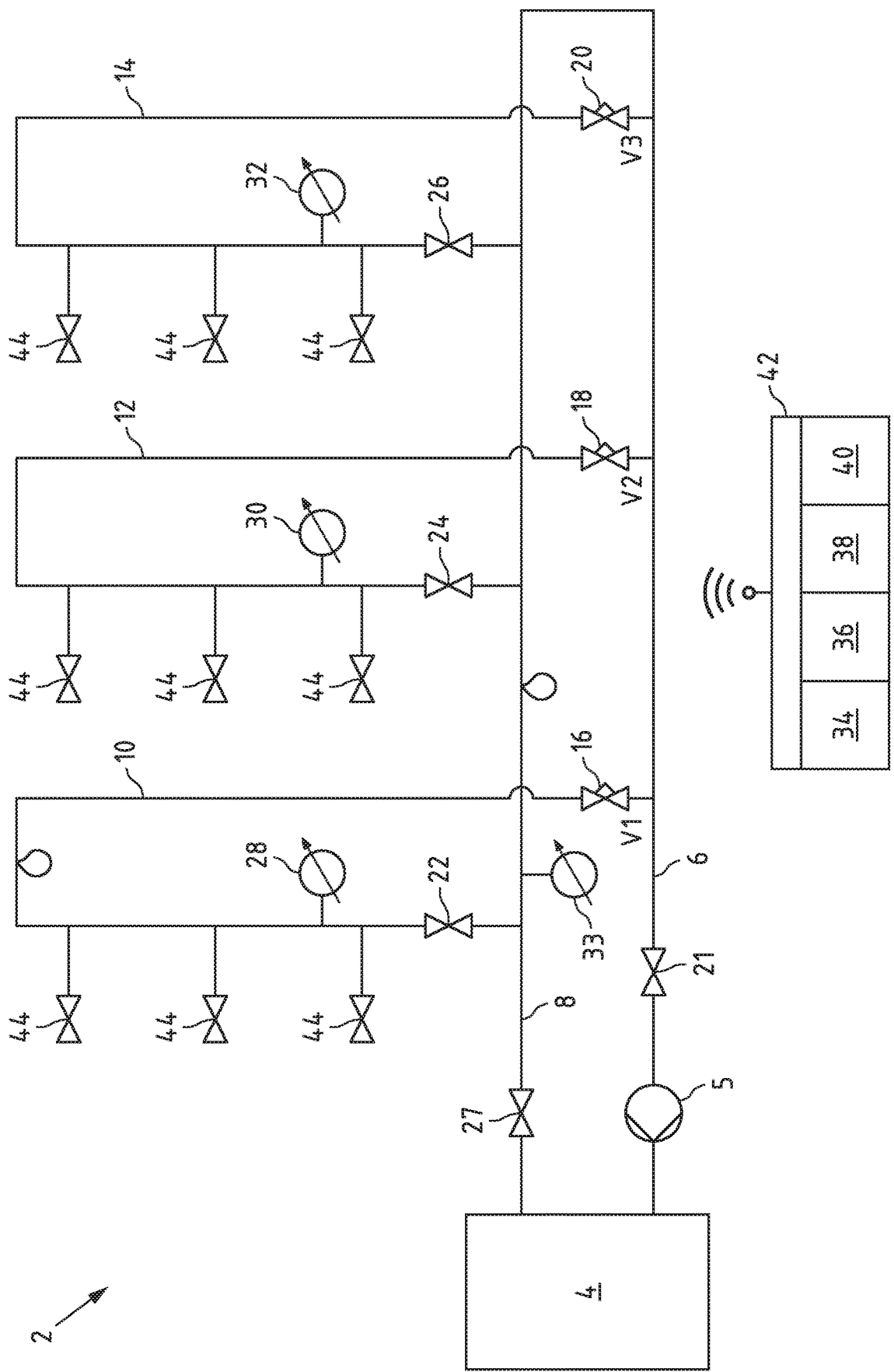

ARRANGEMENT AND METHOD FOR DETECTING LEAKS IN A WATER PIPE SYSTEM

CROSS-REFERENCE TO RELATED APPLICATION

This application claims priority to German Patent Application No. 10 2018 128 855.7 filed Nov. 16, 2018, the disclosure of which is hereby incorporated by reference in its entirety.

BACKGROUND OF THE INVENTION

Field of the Invention

The invention relates to an arrangement and a method for detecting and, if necessary, locating leaks in a water pipe system.

DESCRIPTION OF RELATED ART

In water pipe systems or in general in media-carrying systems, leaks inevitably occur during operation. Leakages are becoming increasingly important because the drinking water network represents the greatest threat to households and buildings. The causes are very diverse, since they are influenced by many parameters and can also differ regionally, e.g. influenced by the water composition. Especially micro-leaks, such as a dripping water tap with a flow rate of 0.04 l/min, are very difficult to detect due to the small quantity.

To prevent damages, more and more leakage systems are being integrated into the installations. In order to keep leakage as low as possible, protective systems are combined with a shut-off valve, which shuts off the system if leakage occurs.

Other types of leakage systems work with a humidity sensor that is placed on the floor in critical areas such as a washroom. At a certain water level, the system strikes. This system is well suited for large leaks (pipe burst 20 l/min). With this method small leaks in the wall are not detected at all or very late.

All known systems which detect a leakage by means of pressure and flow are limited to cold water pipes without circulation. Water sensors that detect electrically conductive liquids are used in critical areas. The leakage localization is for example performed by acoustic localization, endoscopy, thermographic localization or cameras. The disadvantages are that the detection and the localization are two different processes, which are differing in time, resulting in a high damage. In addition, damages, in which only small quantities leak, but over a longer period of time, cannot be registered in this way.

The invention is therefore based on the technical problem of improving the detection and, if necessary, the localization of a leakage.

SUMMARY OF THE INVENTION

The above mentioned technical problem is solved by an arrangement for detecting and locating a leakage in a water pipe system with a water treatment system, with a pump, with a supply line and a drain, with at least one circulation line connected to the supply line and the drain, with at least one inlet valve, at least one outlet valve and at least one pressure sensor in at least one circulation line and/or the supply line and the drain, wherein the inlet valve and the outlet valve are electrically controllable, with control means for controlling the inlet valves and the outlet valves, with detection means for detecting the timewise development of the measured values (P) of the at least one pressure sensor, with evaluation means for evaluating the timewise pressure change (dP/dt) and for comparing the amount of the pressure change (dP/dt) with a limit value, and with output means for the output of a leakage indicating indication signal if the amount of the pressure change (dP/dt) exceeds the limit value.

A water treatment system mentioned above serves to cool or heat the water in the water pipe system and can be designed, for example, as a storage tank with a heating or cooling device or as a flow-through heat exchanger without a storage tank.

The following method can be carried out with the arrangement explained above.

The above shown technical problem is also solved by a method for detecting and locating a leakage in a water pipe system, in which during a learning phase the timewise usage behaviour is determined on the basis of the water withdrawals from at least one section of a pipe system, in which at least one time slot is determined in which the probability of the withdrawal of water from the section is minimal, in which a test mode is activated when the time slot is reached, in which, at the start of the test mode, a section is shut off by means of two valves, in which the water pressure in the section is measured over a predetermined period of time and the change in pressure (dP/dt) is calculated, in which the change in pressure (dP/dt) is compared with a limit value, and in which, if the amount of the change in pressure (dP/dt) exceeds the limit value, a leakage is detected and the location of the leakage is located between the two valves.

The above shown technical problem is also solved by a method of detecting and locating a leak in a water pipe system, in which a stationary nominal pressure ($P_n$) is determined during a learning phase in time periods in which no water withdrawals occur from at least one section of a pipe system, in which, if the stationary nominal pressure ($P_n$) is not reached during operation, a test mode is activated in which a section is shut off by means of two valves at the start of the test mode, in which the water pressure in the section is measured over a predetermined period of time and the pressure change (dP/dt) is calculated, in which the pressure change (dP/dt) is compared with a limit value and in which, if the amount of pressure change (dP/dt) exceeds the limit value, a leakage is detected and the location of the leakage is located between the two valves.

Thus, a leakage can be easily and reliably detected and, if necessary, located by means of a differential pressure method, which in particular is carried out periodically. The more finely meshed the valves, shut-off valves and pressure sensors are placed in the water pipe system, the more accurately the leakage can be located.

For the embodiments described above, the limit value is between 5 and 10 mbar/min. This limit value depends on the system and in particular on the water volume (V) in the system, the nominal pressure ($P_n$) and the leakage rate (Q) to be detected. With the exemplary values V=3 litres, $P_n$=4 bar and Q=0.04 l/min a value of 10 ml/min results.

The above shown technical problem is also solved by a method of detecting a leak in a water pipe system, in which during a learning phase water is pumped through the water pipe system by means of a pump, with at least one value of a flow rate being specified, in which the stationary power consumption of the pump is measured and stored for each of the at least one flow rates and in which a leakage is detected if, during operation, the current power consumption of the pump for one of the specified flow rates falls below the value of the stationary power consumption by a specified amount.

The method described above can be carried out in various ways. On the one hand, the power consumption can be used as the electronic measured value of the pump. On the other hand, the power consumption of the pump can be determined as a mathematical product of the pressure measured at the outlet of the pump (feed pressure) and the flow rate. An example of a value pair for the feed pressure (dP=90 mbar) and the flow rate (Q=300 l/h) calculates the power consumption of the pump to approx. 8.5 watts. A leakage of 0.04 l/min results in a permanent reduction of the power consumption of 0.1 Watt, which can be detected with conventional sensors or pumps.

The embodiments described above are initially based on the knowledge that the water pipe system is continuously analysed during normal operation or at specified time intervals and that at least one parameter changing over time and the usage of the pipe system is determined which is characteristic for the stationary operation without the presence of a leakage. The parameter can be

- a time slot in which no usage is to be expected and normal operation is not affected by the differential pressure test,
- a nominal pressure present in the water pipe system at a position of a pressure sensor, or
- be a stationary power input for a specified flow rate.

On the other hand, this parameter is used to determine a change or deviation from the stationary state of the water pipe system caused by a leakage.

If the parameter is a time slot, a test mode is used within this time slot to determine whether a pressure drop occurs in a section of the water pipe system separated by two valves and whether the magnitude or amount of this pressure drop exceeds a specified limit value. If this condition is fulfilled, a leakage is detected and can be assigned to the corresponding section.

If the parameter is a nominal pressure, the water pipe system is continuously monitored. If it is determined that the pump cannot generate the determined nominal pressure at the assigned pressure sensor at a given flow rate, a leakage in the water pipe system in the section containing the pressure sensor is detected. Subsequently, a test mode is used to determine whether a pressure drop occurs in a section of the water pipe system separated by two valves and whether the magnitude or amount of this pressure drop exceeds a specified limit value. If this condition is fulfilled, a leakage is detected and can be assigned to the corresponding section.

If, on the other hand, the parameter is a stationary power consumption of the pump for a specified flow rate, a leakage in the water pipe system is detected when the power consumption of the pump changes and falls below the value of the stationary power consumption by a given amount. If necessary, a previously described test routine can then be started and the water pipe system is checked for the presence of a leakage in sections.

BRIEF DESCRIPTION OF THE DRAWING

In the following, the invention will be explained using embodiments with reference to the drawing. In the drawing, the only FIG. 1 shows a schematic representation of an arrangement for detecting and locating a leakage in a water pipe system.

DESCRIPTION OF THE INVENTION

FIG. 1 shows an arrangement according to invention 2 for detecting and locating a leakage in a water pipe system, with a water treatment 4, which, for example, can be designed as a hot or cold water treatment or as a heat exchanger, in particular a flow-through heat exchanger, and supplies the water pipe system with hot drinking water.

The arrangement 2 also has a pump 5 as well as a supply line 6 and a drain 8, which are either arranged essentially horizontally on one floor or arranged essentially vertically as risers and downpipes. The supply line 6 is fluidically connected to the drain 8.

Three circulation lines 10, 12 and 14 are connected to the supply line 6 and the drain 8, each having an inlet valve 16, 18 and 20, an outlet valve 22, 24 and 26 and a pressure sensor 28, 30 and 32. The inlet valves 16, 18 and 20 and the outlet valves 22, 24 and 26 are electrically controllable.

In addition, an inlet valve 21 in the supply line 6 and an outlet valve 27 in the drain 8, which can also be electrically controlled, as well as a pressure sensor 33 are provided.

In addition, control means 34 are provided for controlling the inlet valves 16, 18, 20 and 21 and the outlet valves 22, 24, 26 and 27 and detection means 36 for detecting the timewise development of the measured values (P) of the pressure sensors 28, 30 and 32. Evaluation means 38 for evaluating the timewise development of the pressure change (dP/dt) and for comparing the amount of the pressure change (dP/dt) with a limit value are provided and output means 40 for the output of a leakage indicating indication signal if the amount of the pressure change (dP/dt) exceeds the limit value are additionally provided in arrangement 2.

FIG. 1 shows the control means 34 as a separate component, but they can also be integrated into one of the valves or sensors shown.

The control means 34 and the detection means 36 are connected via a data connection to the valves 16 to 27 and pressure sensors 28 to 33 mentioned, which are designed as wireless radio connections, for example WLAN or Bluetooth connections. A radio module 42 is provided for this purpose, which transmits the control signals or acquisition signals. Valves 16 to 27 and pressure sensors 28 to 33 are equipped with radio modules accordingly, without this being shown separately in FIG. 1. The data connection can, however, optionally also be fully or partially wired.

Each of the three circulation pipes 10, 12 and 14 has three water extraction valves 44, which can be designed as washing valve, shower valve, bathtub valve or as toilet flush. Symbols 44 can generally also be used as a symbol for a usage unit or apartment.

In the following, various configurations of methods for detecting and locating a leakage in a water pipe system are described, with reference to the example of the arrangement according to FIG. 1.

The arrangement 2 according to FIG. 1 is initially operated during a learning phase when the method is designed in such a way that the timewise usage behavior is determined on the basis of the water withdrawals via the water extraction valves 44 from one or more sections of the pipeline system. The usage of this system is noticeable as a drop in pressure or a change in the flow rate. The time period of the learning phase can be several days or more than one week. During this time period, the pressure values of the pressure sensors 28 to 33 are recorded and stored at regular intervals by means of the recording devices. This results in the timewise development of the usage habits of the users of the water pipe system.

Subsequently, at least one time slot is determined in which the probability of the withdrawal of water from the section is minimal. Such a time period will probably occur in the late hours of the night, but may also occur during the day.

During the operating mode, a test mode is activated when the time slot is reached, at the beginning of which a section is shut off by means of two valves. For example, the circulation line 10 is tested and the valves 16 and 22 are closed by means of control means 34. For this purpose, the control means 34 transmit the corresponding control signals via the radio connection to the valves 16 and 22.

After the valves 16 and 22 have been closed, the water pressure in the section of the circulation line 10 is measured over a specified time period of 1 to 3 hours, for example, in which the recording means 36 reads out the respective pressure values of the pressure sensor 28 via the radio connection at regular intervals of, for example, one minute or a few minutes and thus records them. The pressure values are stored with corresponding time values, so that the pressure change (dP/dt) is already calculated during and/or after completion of the test mode as a timewise pressure curve.

The same test routine can be performed with valves 18 and 24 for the circulation line 12 or with valves 20 and 26 for the circulation line 14.

To detect a leakage in the circulation line 10, the pressure change (dP/dt) is then compared with a limit value and if the amount of pressure change (dP/dt) exceeds the limit value, a leakage is detected and the location of the leakage is located between the two valves 16 and 22.

During the test mode, the other sections in the circulation pipes 12 and 14 may be tested for the presence of a leakage either simultaneously or successively in the manner described above.

The supply line 6 and the drain 8 can be tested during the test mode by closing the valves 16, 18, 21, 22, 24 and 27 while the valves 20 and 26 remain open. Then the pressure values of the pressure sensor 33 can be used to record and evaluate the timewise development of the pressure change in the manner described above.

In the test mode described above, for example, a limit value between 5 and 10 mbar/min is used to evaluate the pressure values. It should be noted that the pressure drop is not constant, but decreases over time after the valves close. However, since the expected leakage rates are low, an influence of this effect is unlikely.

An alternative to the method of detecting and locating a leakage in a water pipe system described above is, to determine, during a learning phase, a stationary nominal pressure ($P_n$) in time periods where no water withdrawals from a section of a pipe system, i.e. one or more of the circulation pipes 10, 12 or 14, occur. These time periods can be determined in the timewise development of the pressure, measured by the pressure sensors 28, 30, 32 and/or 33, as horizontal sections. The nominal pressure ($P_n$) determined is stored and used for subsequent monitoring.

If the stationary nominal pressure ($P_n$) within the water pipe system at the pressure sensors 28, 30, 32 and/or 33 is not reached during operation, this behavior may indicate a leakage and a test mode is activated as described above in order to detect and, if necessary, locate the leakage.

A further embodiment of a method for detecting a leakage in a water pipe system is described below.

During a learning phase, water is pumped through the water pipe system by means of the pump 5, whereby one value or several values of a flow rate are specified one after the other. The stationary power consumption of pump 5 is measured and stored for each of the at least one flow rate.

If, during operation, the current power consumption of the pump 5 falls below the value of the stationary power consumption for one of the specified flow rates by a specified amount, a leakage is detected. Thus the reduction of the power consumption of pump 5 serves as a indication for the presence of a leakage. This method is based on the knowledge that a leakage in a pipe system reduces the flow resistance so that a lower power consumption is sufficient to generate the flow rate at the same flow rate.

The value of the power consumption can, for example, be determined as the electronic measured value of pump 5. Thus, the pump itself delivers the relevant measured value. However, the power consumption of pump 5 can also be determined as a mathematical product of the pressure measured at the outlet of the pump and the flow rate. For a leakage rate of 0.04 l/min, the change in power consumption can be in the range of 0.1 Watt and can therefore be easily detected.

The invention claimed is:

1. An arrangement for detecting and locating a leak in a water pipe system, comprising:
   a water treatment,
   a pump,
   a supply line and a drain,
   at least one circulation line connected to the supply line and the drain,
   at least one inlet valve, at least one outlet valve and at least one pressure sensor in the at least one circulation line, the inlet valve and the outlet valve being electrically controllable,
   control means for controlling the at least one inlet valve and the at least one outlet valve,
   detection means for detecting timewise development of a pressure measured by the at least one pressure sensor,
   evaluation means for evaluating the timewise development of a pressure change and for comparing an amount of the pressure change with a limit value, and
   output means for outputting a leakage indication signal when the amount of the pressure change exceeds the limit value.

2. The arrangement according to claim 1, wherein the limit value is between 5 and 10 mbar/min.

3. The arrangement according to claim 1, comprising at least one further pressure sensor in the supply line and the drain.

4. A method for detecting and locating a leak in a water pipe system, comprising:
   determining timewise usage behavior on a basis of water withdrawals from at least one section of the water pipe system during a learning phase,
   determining at least one time slot, during which probability of water extraction from the section is minimal,
   activating a test mode when the time slot is reached,
   isolating the section by means of two valves at the beginning of the test mode,
   wherein the section is a circulation line and the two valves are the inlet valve and the outlet valve of the circulation line,
   measuring water pressure in the section over a specified period of time and calculating an amount of pressure change, comparing the amount of pressure change with a limit value, and detecting and locating a leakage between the two valves when the amount of pressure change exceeds the limit value.

5. The method according to claim 4, wherein the limit value is between 5 and 10 mbar/min.

6. A method of detecting and locating a leak in a water pipe system, comprising:

determining a stationary nominal pressure in periods of time where no water abstraction occurs from at least one section of the water pipe system during a learning phase, activating a test mode when the stationary nominal pressure is not reached during operation, isolating the section by means of two valves at the beginning of the test mode, measuring water pressure in the section over a specified period of time and calculating an amount of pressure change, comparing the amount of pressure change with a limit value, and detecting and locating a leakage between the two valves when the amount of pressure change exceeds the limit value.

7. The method according to claim 6, wherein the limit value is between 5 and 10 mbar/min.

8. A method for detecting a leakage in a water pipe system, comprising:

pumping water through the water pipe system by means of a pump and specifying at least one flow rate during a learning phase, measuring and storing stationary power consumption of the pump for the at least one flow rate, and detecting a leakage when current power consumption of the pump for the at least one flow rate falls below the stationary power consumption by a specified amount during operation.

9. The method according to claim 8, wherein the current power consumption of the pump is used as an electronic measured value of the pump.

10. The method according to claim 8, wherein the current power consumption of the pump is determined as a mathematical product of a pressure measured at an outlet of the pump and the flow rate.

\* \* \* \* \*